United States Patent
Takaiwa

(10) Patent No.: US 7,557,940 B2
(45) Date of Patent: Jul. 7, 2009

(54) IMAGE CAPTURE APPARATUS

(75) Inventor: Kan Takaiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 10/867,246

(22) Filed: Jun. 14, 2004

(65) Prior Publication Data

US 2005/0007626 A1  Jan. 13, 2005

(51) Int. Cl.
*G06F 15/00* (2006.01)
*G06F 3/12* (2006.01)
*G06K 1/00* (2006.01)

(52) U.S. Cl. ..................... 358/1.13; 358/1.15
(58) Field of Classification Search ......... 358/1.1–1.18, 358/426.07, 426.11, 426.13, 426.14, 426.15, 358/426.16
See application file for complete search history.

(56) References Cited

U.S. PATENT DOCUMENTS

| | | | |
|---|---|---|---|
| 5,852,710 A * | 12/1998 | Shiohara et al. | 358/1.16 |
| 6,304,336 B1 | 10/2001 | Sugaya | |
| 6,384,928 B2 * | 5/2002 | Nagasawa et al. | 358/1.15 |
| 7,150,510 B2 * | 12/2006 | Walmsley | 347/15 |
| 2002/0036695 A1 | 3/2002 | Kawade | |
| 2002/0105678 A1 | 8/2002 | Shiraiwa | |
| 2005/0151986 A1 * | 7/2005 | Hisatomi et al. | 358/1.13 |

FOREIGN PATENT DOCUMENTS

| | | |
|---|---|---|
| CN | 1370007 | 9/2002 |
| JP | 10-175332 A | 6/1998 |
| JP | 10-229544 | 8/1998 |
| JP | 11-112932 A | 4/1999 |
| JP | 2002-033953 A | 1/2002 |
| JP | 2003-116089 A | 4/2003 |

OTHER PUBLICATIONS

JPEG (Joint Photographic Expert Group) ISO/IEC 10918-1:1994 (iso.org).

* cited by examiner

*Primary Examiner*—Douglas Q Tran
(74) *Attorney, Agent, or Firm*—Canon U.S.A. Inc., I.P. Division

(57) ABSTRACT

An image capture apparatus determines whether a compression format of a selected image is a first compression format or a second compression format, and determines whether a first substitute image compressed in the first compression format is stored in a recording medium if the compression format of the selected image is the second compression format. The image capture apparatus generates a second substitute image compressed in the first compression format from the selected image, if the compression format of the selected image is the second compression format. The image capture apparatus transmits the selected image to a printing apparatus if the compression format of the selected image is the first compression format, and transmits the second substitute image to a printing apparatus in place of the selected image if the first substitute image is not stored in the recording medium.

12 Claims, 4 Drawing Sheets

FIG.4

| RECORDING MODE | IMAGE SIZE |
|---|---|
| RAW MODE | 3072 × 2048 PIXELS |
| JPEG MODE (L) | 3072 × 2048 PIXELS |
| JPEG MODE (M) | 2048 × 1360 PIXELS |
| JPEG MODE (S) | 1536 × 1024 PIXELS |
| RAW + JPEG MODE (L) | RAW 3072 × 2048 PIXELS<br>JPEG 3072 × 2048 PIXELS |
| RAW + JPEG MODE (M) | RAW 3072 × 2048 PIXELS<br>JPEG 2048 × 1360 PIXELS |
| RAW + JPEG MODE (S) | RAW 3072 × 2048 PIXELS<br>JPEG 1536 × 1024 PIXELS |

IMAGE CAPTURE APPARATUS

BACKGROUND OF THE INVENTION

1. Field of the Invention

The present invention relates to an image capture apparatus, such as a digital camera, or the like, capable of communicating with a printing apparatus.

2. Description of Related Art

In recent years, a printing system composed of a digital camera and a printer (a so-called "direct printing system"), has been proposed, as disclosed in, for example, Japanese Laid-Open Patent Applications No. Hei 10-229544 and No. 2002-94910. The direct printing system dispenses with any operation on a personal computer and, therefore, can be said to be a printing system that is suitable for users who are inexperienced in operating personal computers or for users who are desirous of printing, with simple operation, digital images taken with digital cameras.

The conventional direct printing system is capable of printing a taken image that has been compressed according to a JPEG (Joint Photographic Experts Group) format (i.e., a compression format using a JPEG compression algorithm (for example, conforming to ISO/IEC 10918-1:1994). However, the conventional direct printing system is incapable of printing a taken image that has been compressed according to a RAW format (i.e., a compression format using a lossless compression algorithm). Therefore, in the conventional direct printing system, if a compression format of a taken image selected by the user is the RAW format, the taken image cannot be printed.

SUMMARY OF THE INVENTION

The present invention overcomes the above-described drawbacks. The present invention enables a taken image selected by the user to be printed even if a compression format of the taken image is the RAW format.

According to an aspect of the present invention, an image capture apparatus is disclosed. The image capture apparatus is capable of communicating with a printing apparatus that is capable of printing an image compressed according to a first compression format but that is incapable of printing an image compressed according to a second compression format. The image capture apparatus includes a determination unit that determines whether a compression format of a selected image is the first compression format. The image capture apparatus also includes a transmission unit that is coupled to the determination unit and that transmits to the printing apparatus one of a first image of the first compression format recorded together with the selected image in a recording medium and a second image of the first compression format generated from the selected image, in place of the selected image, if it is determined by the determination unit that the compression format of the selected image is not the first compression format.

According to another aspect of the present invention, a method for use with an image capture apparatus capable of communicating with a printing apparatus that is capable of printing an image compressed according to a first compression format but that is incapable of printing an image compressed according to a second compression format is disclosed. The method determines whether a compression format of a selected image is the second compression format. If the compression format of the selected image is the second compression format, the method substitutes a substitute image of the first compression format for the selected image and transmits the substitute image to the printing apparatus.

The above and further features and advantages of the present invention will become apparent to those skilled in the art upon reading of the following detailed description of preferred embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing an exemplary list of recording modes of the digital camera shown in FIG. 1.

DETAILED DESCRIPTION OF THE PREFERRED EMBODIMENTS

Preferred embodiments of the invention are described in detail below with reference to the drawings.

First Embodiment

A first embodiment of the invention includes a compression format using a JPEG compression algorithm (for example, conforming to ISO/IEC10918-1:1994), which is referred to herein as a "JPEG format." A digital image that has been compressed according to the JPEG format is referred to herein as a "JPEG image." Also included in the first embodiment is a compression format using a lossless compression algorithm (for example, a combination of DPCM (Differential Pulse Code Modulation) and Huffman coding), which is referred to herein as a "RAW format." A digital image that has been compressed according to the RAW format is referred to herein as a "RAW image."

An image printing system according to the first embodiment is described below with reference to FIG. 1.

Figure 1:
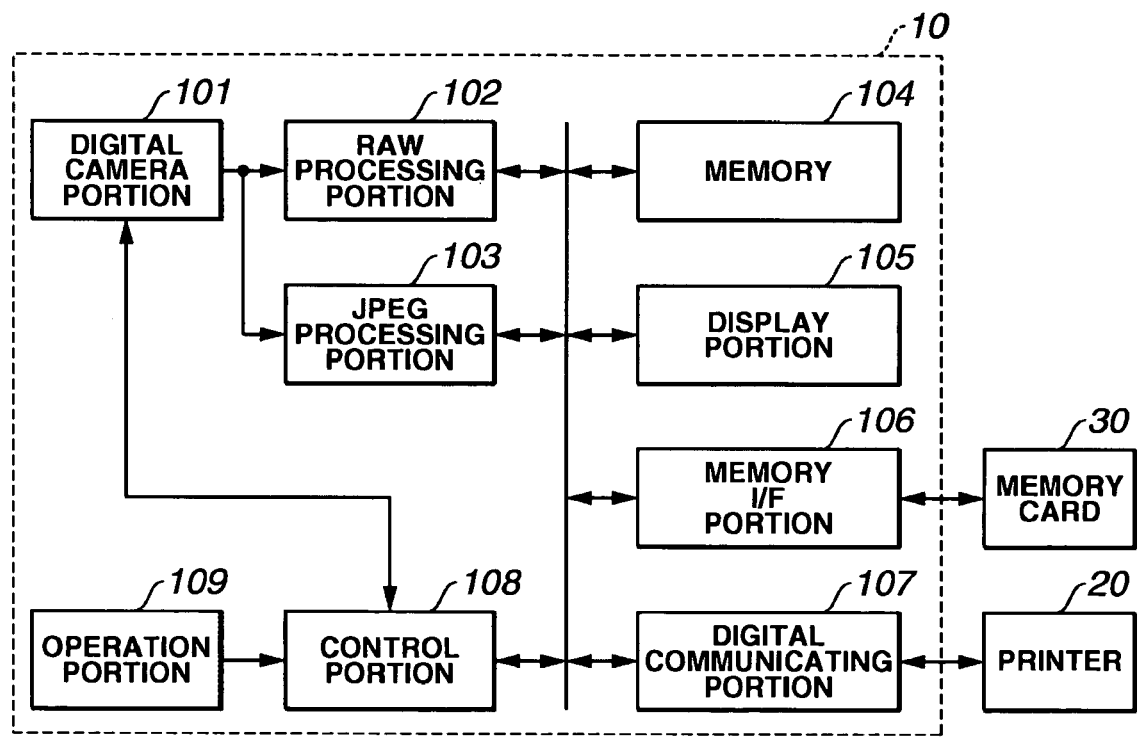
FIG. 1 is a block diagram illustrating principal constituent elements of an image printing system according to a first embodiment of the invention.

The image printing system shown in FIG. 1 includes a digital camera 10, a printer 20, and a memory card 30. The digital camera 10 is an example of an image capture apparatus. The printer 20 is an example of a printing apparatus. The memory card 30 is removably attached to the digital camera 10 and is an example of a random-accessible recording medium. The digital camera 10 is an apparatus that is capable of being connected directly to the printer 20 through a communication cable or through wireless communication, and is capable of communicating directly with the printer 20. (As used herein, "connected directly" means not via a personal computer or the like.) The digital camera 10 may include a function of taking moving pictures with sound and recording the moving pictures with sound in the memory card 30, in addition to the function of taking still images of objects and recording the still images in the memory card 30. The printer 20 is an apparatus that is capable of printing a JPEG image but is not capable of printing a RAW image.

The digital camera 10 includes a digital camera portion 101, a RAW processing portion 102, a JPEG processing portion 103, a memory 104, a display portion 105, a memory interface (I/F) portion 106, a digital communication portion 107, a control portion 108, and an operation portion 109. The digital camera portion 101 has the function of taking a digital image of an object by means of an image capture element (CCD sensor, CMOS sensor or the like), etc. The RAW processing portion 102 has the function of generating a RAW image and its supplemental information (including a reduced image, information indicative of the kind of recording mode, etc.) from the taken image. The JPEG processing portion 103 has the function of generating a JPEG image and its supplemental information (including a reduced image, information indicative of the kind of recording mode, etc.) from the taken image. The display portion 105 has a liquid crystal display device. The memory interface portion 106 has the function of accessing the memory card 30. The digital communicating portion 107 has the function of transmitting a JPEG image, etc., directly to the printer 20. The control portion 108 controls the various processing operations to be performed in the digital camera 10. The operation portion 109 is configured to allow the user to give instructions to the control portion 108.

The digital camera 10 has various recording modes, for example, as shown in FIG. 4. In recording, one of the recording modes is selected by the user manipulating the operation portion 109. RAW mode is a recording mode in which a RAW image (image size: 3072×2048 pixels) is generated from a taken image and the RAW image generated is recorded in the memory card 30. JPEG mode (L) is a recording mode in which a large-sized JPEG image (image size: 3072×2048 pixels) is generated from a taken image and the JPEG image generated is recorded in the memory card 30. JPEG mode (M) is a recording mode in which a medium-sized JPEG image (image size: 2048×1360 pixels) is generated from a taken image and the JPEG image generated is recorded in the memory card 30. JPEG mode (S) is a recording mode in which a small-sized JPEG image (image size: 1536×1024 pixels) is generated from a taken image and the JPEG image generated is recorded in the memory card 30. RAW+JPEG mode (L) is a recording mode in which a RAW image (image size: 3072×2048 pixels) and a large-sized JPEG image (image size: 3072×2048 pixels) are generated from a taken image and the RAW image and JPEG image generated are recorded in the memory card 30. RAW+JPEG mode (M) is a recording mode in which a RAW image (image size: 3072×2048 pixels) and a medium-sized JPEG image (image size: 2048×1360 pixels) are generated from a taken image and the RAW image and JPEG image generated are recorded in the memory card 30. RAW+JPEG mode (S) is a recording mode in which a RAW image (image size: 3072×2048 pixels) and a small-sized JPEG image (image size: 1536×1024 pixels) are generated from a taken image and the RAW image and JPEG image generated are recorded in the memory card 30.

Figure 2:
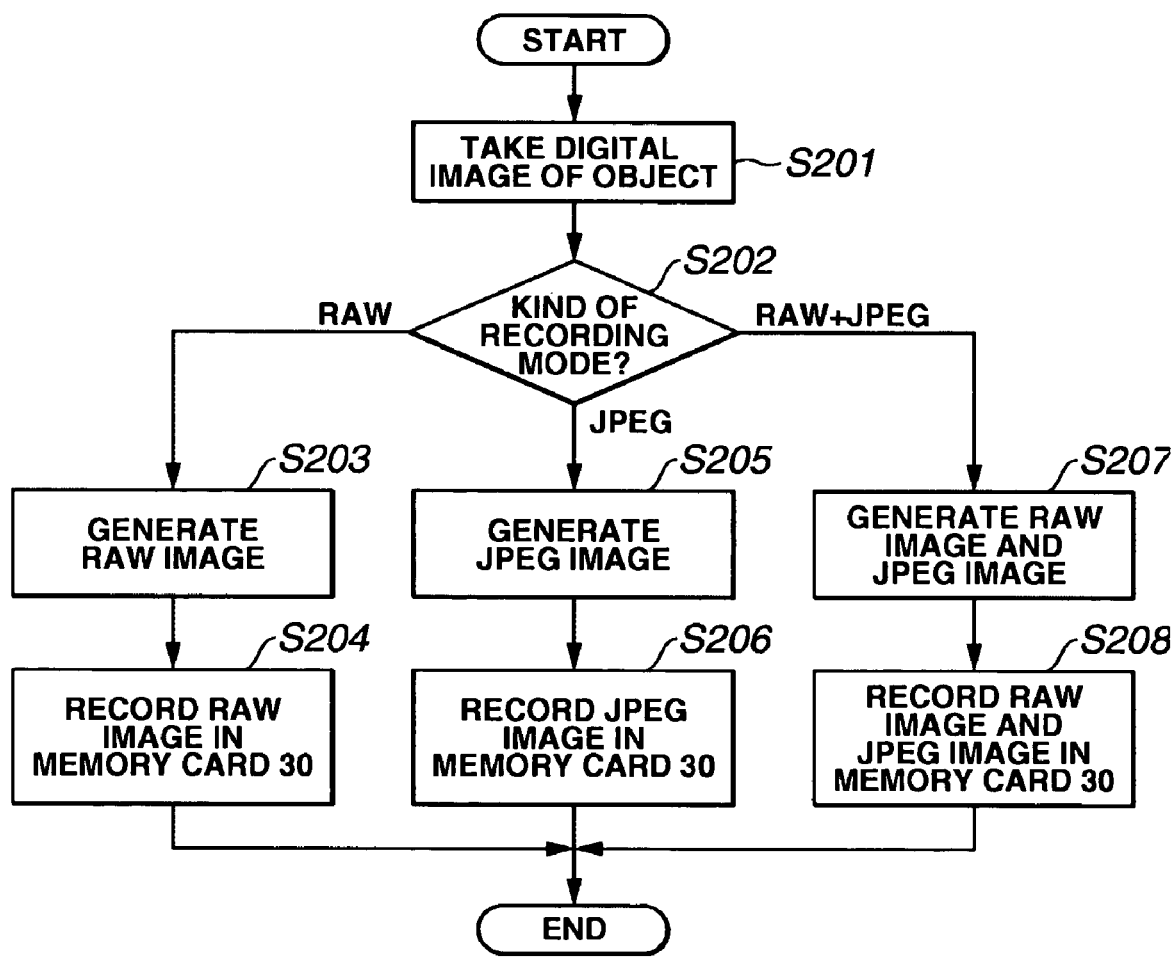
FIG. 2 is a flow chart illustrating an image taking process to be executed with a digital camera shown in FIG. 1.

An image taking process to be executed with the digital camera 10 is described with reference to FIG. 2. The image taking process shown in FIG. 2 is executed each time a shutter release button disposed in the operation portion 109 is pressed by the user.

In step S201, the control portion 108 requests the digital camera portion 101 to start the image taking process. The digital camera portion 101 then takes a digital image of an object by means of an image capture element, etc.

Next, in step S202, the control portion 108 determines the kind of a recording mode that is currently selected. If the current recording mode is the RAW mode, the flow of the image taking process proceeds to step S203. If the current recording mode is the JPEG mode (L), (M) or (S), the flow proceeds to step S205. If the current recording mode is the RAW+JPEG mode (L), (M) or (S), the flow proceeds to step S207.

In step S203 (RAW mode), the control portion 108 requests the RAW processing portion 102 to generate a RAW image (step S203). The RAW processing portion 102 generates a RAW image and its supplemental information from the taken image, and writes the generated RAW image and its supplemental information into the memory 104. The RAW processing portion 102 does not adjust the white balance, gamma value, contrast, sharpness (emphasis for edges), color density, hue, etc., of the taken image prior to image compression. The display portion 105 displays a reduced image of the RAW image on the liquid crystal display device.

In step S204, the control portion 108 requests the memory interface portion 106 to record the RAW image. The memory interface portion 106 writes, into the memory card 30, the RAW image and its supplemental information stored in the memory 104. Processing of FIG. 2 then ends.

In step S205 (JPEG mode), the control portion 108 requests the JPEG processing portion 103 to generate a JPEG image. The JPEG processing portion 103 generates a JPEG image and its supplemental information from the taken image, and writes the generated JPEG image and its supplemental information into the memory 104. The JPEG processing portion 103 adjusts the white balance, gamma value, contrast, sharpness (emphasis for edges), color density, hue, etc., of the taken image prior to image compression. The display portion 105 displays a reduced image of the JPEG image on the liquid crystal display device.

Next, in step S206, the control portion 108 requests the memory interface portion 106 to record the JPEG image. The memory interface portion 106 writes, into the memory card 30, the JPEG image and its supplemental information stored in the memory 104. Processing of FIG. 2 then ends.

In step S207 (RAW+JPEG mode), the control portion 108 requests the RAW processing portion 102 to generate a RAW image and also requests the JPEG processing portion 103 to generate a JPEG image. The RAW processing portion 102 generates a RAW image and its supplemental information from the taken image, and writes the generated RAW image and its supplemental information into the memory 104. The RAW processing portion 102 does not adjust the white balance, gamma value, contrast, sharpness (emphasis for edges), color density, hue, etc., of the taken image prior to image compression. The JPEG processing portion 103 generates a JPEG image and its supplemental information from the taken image, and writes the generated JPEG image and its supplemental information into the memory 104. The JPEG processing portion 103 adjusts the white balance, gamma value, contrast, sharpness (emphasis for edges), color density, hue, etc., of the taken image prior to image compression. The display portion 105 displays a reduced image of the RAW image on the liquid crystal display device.

Next, in step S208, the control portion 108 requests the memory interface portion 106 to record the RAW image and the JPEG image. The memory interface portion 106 writes, into the memory card 30, the RAW information and its supplemental information stored in the memory 104, and also writes, into the memory card 30, the JPEG image and its supplemental information stored in the memory 104. The RAW image and the JPEG image can be stored together in a single image file to be recorded in the memory card 30, or can be stored separately in respective image files to be recorded in the memory card 30. In this regard, however, in cases where the RAW image and the JPEG image are stored in separate image files to be recorded in the memory card 30, the digital camera 10 is made to add, to one image file, information for identifying the other image file. Processing of FIG. 2 then ends.

Figure 3:
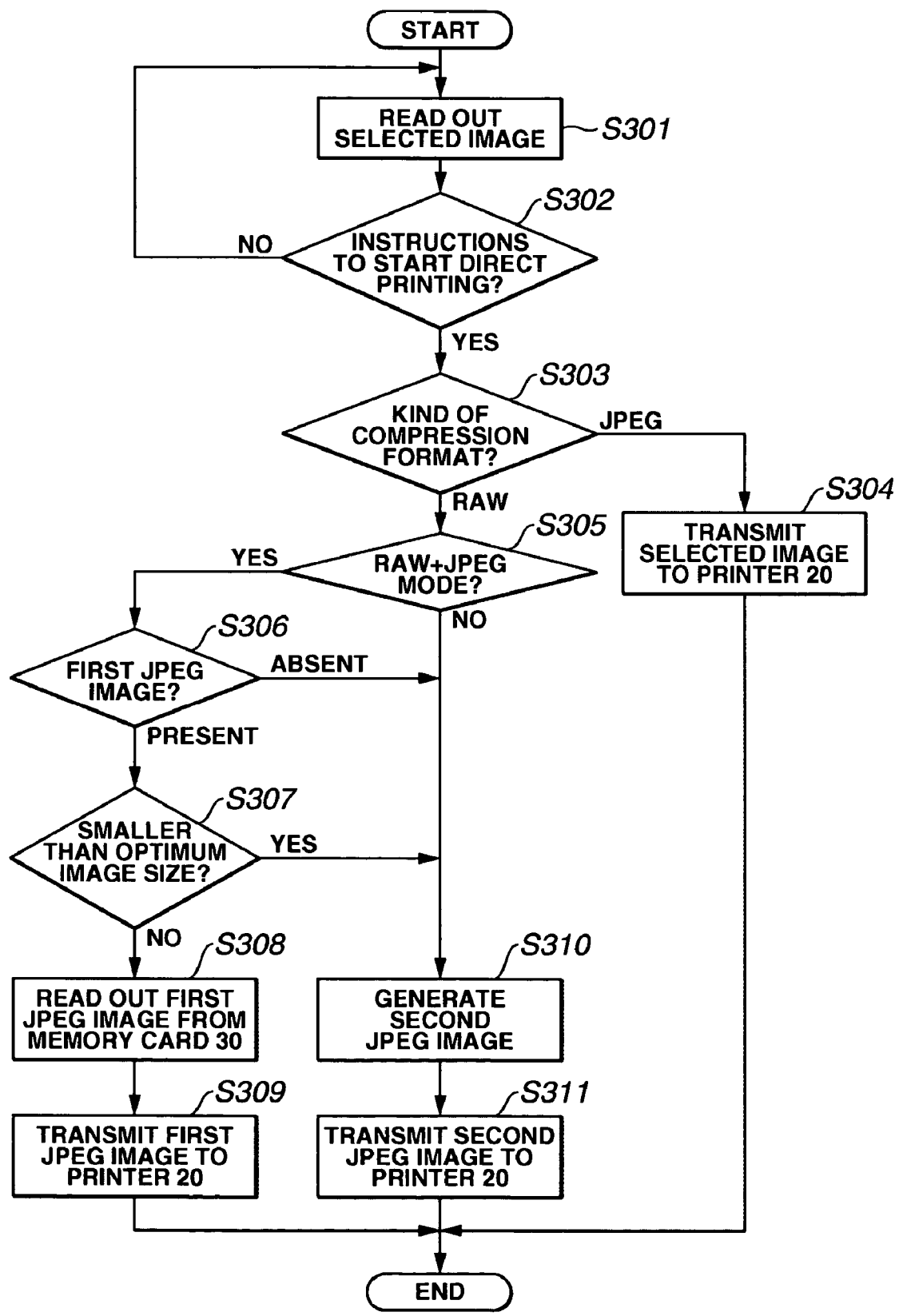
FIG. 3 is flow chart illustrating a direct printing process to be executed with the image printing system shown in FIG. 1.

A direct printing process to be executed with the image printing system shown in FIG. 1 is described below with reference to FIG. 3. The direct printing process shown in FIG. 3 is executed after the digital camera 10 is connected directly to the printer 20 through a communication cable or through wireless communication.

In step S301, the control portion 108 requests the memory interface portion 106 to read out a taken image selected by the user (hereinafter referred to as a "selected image"). The memory interface portion 106 reads out the selected image and its supplemental information from the memory card 30, and writes the read-out selected image and its supplemental information into the memory 104. The display portion 105 displays a reduced image of the selected image on the liquid crystal display device. The user, when intending to perform direct printing, manipulates the operation portion 109 to select the size of printing paper, the style of printing (marginless printing or margined printing), the number of sets for printing, etc., and gives instructions to start direct printing.

In step S302, the control portion 108 determines whether the user has given instructions to start direct printing. If the user has not given instructions to start direct printing, the flow of the direct printing process returns to step S301. However, if the user has given instructions to start direct printing, the flow of the direct printing process proceeds to step S303.

In step S303, the control portion 108 determines the kind of compression format of the selected image (i.e., a format according to which the selected image has been compressed). If the compression format of the selected image is the JPEG format (i.e., the selected image is a JPEG image), the flow proceeds to step S304. If the compression format of the selected image is the RAW format (i.e., the selected image is a RAW image), the flow proceeds to step S305.

In step S304 (selected image is a JPEG image), the control portion 108 requests the digital communicating portion 107 to start a process of transmitting the selected image directly to the printer 20. The digital communicating portion 107 transmits, directly to the printer 20, the selected image and its supplemental information stored in the memory 104. In this instance, the digital communicating portion 107 obtains printing auxiliary information (including the size of printing paper, the style of printing, the number of sets for printing, etc., selected by the user) from the control portion 108, and transmits the obtained printing auxiliary information directly to the printer 20. The printer 20 prints the selected image according to the printing auxiliary information. The process shown in FIG. 3 then ends.

In step S305 (selected image is a RAW image), the control portion 108 examines the supplemental information of the selected image to determine whether the recording mode of the selected image (i.e., a recording mode according to which the selected image has been recorded) is the RAW+JPEG mode (L), (M) or (S). If the recording mode of the selected image is the RAW+JPEG mode (L), (M) or (S), the flow proceeds to step S306. If the recording mode of the selected image is none of the RAW+JPEG mode (L), (M) and (S), the flow proceeds to step S310.

In step S306 (RAW+JPEG mode (L), (M) or (S)), the control portion 108 determines whether a JPEG image that has been recorded together with the selected image in the memory card 30 (hereinafter referred to as a "first JPEG image") is present in the memory card 30. If the first JPEG image is present in the memory card 30, the flow proceeds to step S307. If the first JPEG image is not present in the memory card 30, the flow proceeds to step S310.

If a first JPEG image is present (yes in step S306), the control portion 108 determines whether the image size of the first JPEG image is smaller than an optimum image size in step S307. Here, the optimum image size means an image size that is most appropriate for the resolving power of the printer 20 and the size of printing paper. For example, in cases where the resolving power of the printer 20 is 2880×1440 dpi and the size of printing paper is A4, the optimum image size is the large size (3072×2048 pixels). If the image size of the first JPEG image is not smaller than the optimum image size, the flow proceeds to step S308. For example, if the image size of the first JPEG image is the large size, the medium size or the small size and the optimum image size is the small size, the flow proceeds to step S308. If the image size of the first JPEG image is smaller than the optimum image size, the flow proceeds from step S307 to step S310. For example, if the image size of the first JPEG image is the medium size or the small size and the optimum image size is the large size, the flow proceeds from step S307 to step S310.

In step S308, the control portion 108 requests the memory interface portion 106 to read out the first JPEG image. The memory interface portion 106 reads out the first JPEG image and its supplemental information from the memory card 30, and writes the read-out first JPEG image and its supplemental information into the memory 104.

Next, in step S309, the control portion 108 requests the digital communicating portion 107 to start a process of transmitting the first JPEG image in place of the selected image directly to the printer 20. The digital communicating portion 107 transmits, directly to the printer 20, the first JPEG image and its supplemental information stored in the memory 104. In this instance, the digital communicating portion 107 obtains printing auxiliary information (including the size of printing paper, the style of printing, the number of sets for printing, etc., selected by the user) from the control portion 108, and transmits the obtained printing auxiliary information directly to the printer 20. The printer 20 prints the first JPEG image according to the printing auxiliary information. The process shown in FIG. 3 then ends.

If it is determined in step S305 that the format recording mode of the selected image is none of the RAW+JPEG mode (L), (M) and (S) (i.e., RAW mode only), or it is determined in step S306 that there is no first JPEG image, or it is determined in step S307 that the image size of the first JPEG image is smaller than the optimum image size, the flow proceeds to step S310. In step S310, the control portion 108 requests the RAW processing portion 102 to decompress the RAW image and also requests the JPEG processing portion 103 to generate a JPEG image having the image size suited for the optimum image size (hereinafter referred to as a "second JPEG image"). The RAW processing portion 102 decompresses the selected image stored in the memory 104. The JPEG processing portion 103 generates the second JPEG image and its supplemental information from the selected image decompressed by the RAW processing portion 102, and writes the generated second JPEG image and its supplemental information into the memory 104. For example, if the image size of the selected image is the medium size or the small size and the optimum image size is the large size, the image size of the second JPEG image becomes the large size.

Next, in step S311, the control portion 108 requests the digital communicating portion 107 to start a process of transmitting the second JPEG image in place of the selected image directly to the printer 20. The digital communicating portion 107 transmits, directly to the printer 20, the second JPEG image and its supplemental information stored in the memory 104. The digital communicating portion 107 obtains printing auxiliary information (including the size of printing paper, the style of printing, the number of sets for printing, etc., selected by the user) from the control portion 108, and transmits the obtained printing auxiliary information directly to the printer 20. The printer 20 prints the second JPEG image according to the printing auxiliary information. The process shown in FIG. 3 then ends.

With the digital camera 10 according to the first embodiment configured as described above, if the compression format of the selected image is the RAW format, the first JPEG image or the second JPEG image can be transmitted in place of the selected image directly to the printer 20. Accordingly, even if the compression format of the selected image is the RAW format, the selected image can be printed.

Further, with the digital camera 10 according to the first embodiment configured as described above, if the compression format of the selected image is the RAW format, a JPEG image recorded together with the selected image in the memory card 30 or a JPEG image generated from the selected image can be transmitted in place of the selected image directly to the printer 20. Accordingly, even if the compression format of the selected image is the RAW format, the selected image can be printed.

Other Embodiments

The present invention should not be construed as being limited to the first embodiment but may be implemented with various embodiments other than the first embodiment.

For example, the present invention can be applied to an apparatus having the function similar to that of the digital camera 10.

Furthermore, for example, the present invention can be applied to an apparatus that is capable of compressing taken images according to a compression format other than the JPEG format provided that the compression format is acceptable to printing apparatuses. Accordingly, the present invention can be applied to an apparatus that is capable of compressing taken images according to a JPEG 2000 compression algorithm (for example, conforming to ISO/IEC 15444-1:2000).

The above-described preferred embodiments are merely exemplary of the present invention, and are not to be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An image capture apparatus communicating with a printing apparatus, the printing apparatus being capable of printing an image compressed in a first compression format but not being capable of printing an image compressed in a second compression format, the image capture apparatus comprising:

a determination unit that determines whether a compression format of a selected image is the first compression format or the second compression format, and determines whether a first substitute image compressed in the first compression format is stored in a recording medium if the compression format of the selected image is the second compression format;

a second substitute image generating unit that generates a second substitute image compressed in the first compression format from the selected image if the compression format of the selected image is the second compression format; and a transmission unit coupled to said determination unit, said transmission unit (a) transmitting the selected image to the printing apparatus if said determination unit determines that the compression format of the selected image is the first compression format, (b) transmitting the second substitute image to the printing apparatus in place of the selected image if said determination unit determines that the first substitute image is not stored in the recording medium, and (c) transmitting one of the first substitute image and the second substitute image to the printing apparatus in place of the selected image if said determination unit determines that the first substitute image is stored in the recording medium, wherein the second compression format is a compression format using a lossless compression algorithm.

2. An image capture apparatus according to claim 1, wherein the first compression format is a compression format using a JPEG compression algorithm.

3. An image capture apparatus according to claim 2, wherein the first compression format is a compression format using a compression algorithm conforming to one of ISO/IEC 10918-1:1994 and ISO/IEC 15444-1:2000.

4. An image capture apparatus according to claim 1, wherein said transmission unit transmits one of the first substitute image and the second substitute image to the printing apparatus in place of the selected image depending on a size of printing paper and a resolving power of the printing apparatus if said determination unit determines that the first substitute image is stored in the recording medium.

5. An image capture apparatus according to claim 4, wherein the first compression format is a compression format using a JPEG compression algorithm.

6. An image capture apparatus according to claim 5, wherein the first compression format is a compression format using a compression algorithm conforming to one of ISO/IEC 10918-1:1994 and ISO/IEC 15444-1:2000.

7. A method for controlling an image capture apparatus communicating with a printing apparatus, the printing apparatus being capable of printing an image compressed in a first compression format but not being capable of printing an image compressed in a second compression format, the method comprising:

determining whether a compression format of a selected image is the first compression format or the second compression format;

determining whether a first substitute image compressed in the first compression format is stored in a recording medium if it is determined that the compression format of the selected image is the second compression format;

generating a second substitute image compressed in the first compression format from the selected image if it is determined that the compression format of the selected image is the second compression format;

transmitting the selected image to the printing apparatus if the compression format of the selected image is the first compression format;

transmitting the second substitute image to the printing apparatus in place of the selected image if it is determined that the first substitute image is not stored in the recording medium; and transmitting one of the first substitute image and the second substitute image to the printing apparatus in place of the selected image if it is determined that the first substitute image is stored in the recording medium, wherein the second compression format is a compression format using a lossless compression algorithm.

8. A method according to claim 7, wherein the first compression format is a compression format using a JPEG compression algorithm.

9. A method according to claim 8, wherein the first compression format is a compression format using a compression algorithm conforming to one of ISO/IEC 10918-1:1994 and ISO/IEC 15444-1:2000.

10. A method according to claim 7, wherein one of the first substitute image and the second substitute image is transmitted to the printing apparatus in place of the selected image depending on a size of printing paper and a resolving power of the printing apparatus if it is determined that the first substitute image is stored in the recording medium.

11. A method according to claim 10, wherein the first compression format is a compression format using a JPEG compression algorithm.

12. A method according to claim 11, wherein the first compression format is a compression format using a compression algorithm conforming to one of ISO/IEC 10918-1:1994 and ISO/IEC 15444-1:2000.

* * * * *